United States Patent
Appachi gounder et al.

(10) Patent No.: US 12,432,150 B2
(45) Date of Patent: Sep. 30, 2025

(54) SYSTEM AND APPARATUS TO SYNCHRONIZE ENTRIES BETWEEN REDUNDANT CENTRALIZED GATEWAYS IN OVERLAY NETWORKS

(71) Applicant: Google LLC, Mountain View, CA (US)

(72) Inventors: Arivudainambi Appachi gounder, San Jose, CA (US); Randal Cevallos, Austin, TX (US); Arie Vayner, Sunnyvale, CA (US); Edward Crabbe, Seattle, WA (US)

(73) Assignee: Google LLC, Mountain View, CA (US)

( * ) Notice: Subject to any disclaimer, the term of this patent is extended or adjusted under 35 U.S.C. 154(b) by 143 days.

(21) Appl. No.: 18/200,639

(22) Filed: May 23, 2023

(65) Prior Publication Data

US 2024/0396843 A1 Nov. 28, 2024

(51) Int. Cl.
*H04L 47/20* (2022.01)
*H04L 12/66* (2006.01)
*H04L 45/64* (2022.01)

(52) U.S. Cl.
CPC .............. *H04L 47/20* (2013.01); *H04L 12/66* (2013.01); *H04L 45/64* (2013.01)

(58) Field of Classification Search
CPC ......... H04L 47/20; H04L 12/66; H04L 45/64; H04L 61/58; H04L 45/745
See application file for complete search history.

(56) References Cited

U.S. PATENT DOCUMENTS

| | | | |
|---|---|---|---|
| 9,634,893 B2 | 4/2017 | Boutros et al. | |
| 9,794,176 B2 | 10/2017 | Qiang | |
| 9,900,250 B2 | 2/2018 | Dong et al. | |
| 9,948,472 B2 | 4/2018 | Drake et al. | |
| 10,027,589 B1* | 7/2018 | Singh | H04L 61/103 |
| 10,361,972 B2 | 7/2019 | Biruduraju | |
| 10,938,627 B2 | 3/2021 | Gao et al. | |
| 11,012,355 B2 | 5/2021 | Wang et al. | |
| 11,310,079 B2 | 4/2022 | Wang et al. | |
| 11,425,044 B2 | 8/2022 | Nadipally et al. | |
| 12,015,544 B1* | 6/2024 | Lo | H04L 45/50 |
| 2008/0247395 A1* | 10/2008 | Hazard | H04L 45/04 370/392 |
| 2010/0325257 A1* | 12/2010 | Goel | H04L 61/103 709/244 |

(Continued)

FOREIGN PATENT DOCUMENTS

| | | | |
|---|---|---|---|
| CN | 107948041 A | 4/2018 | |
| CN | 111130981 A | 5/2020 | |

OTHER PUBLICATIONS

International Search Report and Written Opinion for PCT Application No. PCT/US2023/035478, dated Jan. 3, 2024. 12 pages.

*Primary Examiner* — Chris Parry
*Assistant Examiner* — Steven C Nguyen
(74) *Attorney, Agent, or Firm* — Lerner David LLP

(57) ABSTRACT

Aspects of the disclosure are directed to a provider edge synchronizer for coordinating entries in an overlay network. The provider edge synchronizer can determine and maintain mappings for hosts in the overlay network using lookup tables. When a provider edge in the overlay network sends a request, the provider edge synchronizer can generate a response based on the lookup tables and can then send the response to all gateways, particularly redundant centralized gateways.

20 Claims, 6 Drawing Sheets

(56) References Cited

U.S. PATENT DOCUMENTS

| | | |
|---|---|---|
| 2019/0034226 A1* | 1/2019 | Gao ..................... G06F 9/4856 |
| 2020/0014623 A1 | 1/2020 | Wang et al. |
| 2021/0168125 A1* | 6/2021 | Vemulpali ............. H04L 9/3236 |
| 2021/0243118 A1 | 8/2021 | Suryanarayana et al. |
| 2021/0385155 A1* | 12/2021 | Suryanarayana ....... H04L 45/76 |
| 2022/0174042 A1 | 6/2022 | Cometto et al. |
| 2022/0385620 A1* | 12/2022 | Sinha .................... H04L 61/103 |

\* cited by examiner

Tunnel Endpoint Table 302

| Tunnel Endpoint IP Address | Tunnel Identifier | Gateway |
|---|---|---|
| 1.1.1.1 | 20300 | No |
| 2.2.2.2 | 20200 | Yes |

MAC IP Table 304

| MAC Address | IP Address | Gateway |
|---|---|---|
| 00:01:02:03:04:05:01 | 10.10.10.1 | Yes |
| 00:01:02:03:04:05:01 | 10.10.10.254 | No |

FIG. 3

SYSTEM AND APPARATUS TO SYNCHRONIZE ENTRIES BETWEEN REDUNDANT CENTRALIZED GATEWAYS IN OVERLAY NETWORKS

BACKGROUND

In an overlay network, data packet routing between layers can be performed by centralized gateways. The overlay network can deploy redundant centralized gateways, such as for resiliency reasons. However, deploying redundant centralized gateways can cause synchronization difficulties between the redundant centralized gateways. For example, if a redundant centralized gateway does not have a mapping for a host, the redundant centralized gateway can request the mapping from the host. However, the host may send a reply with the mapping to another redundant centralized gateway, which may or may not already have the mapping. This can result in traffic loss as data packets are dropped due to the wrong redundant centralized gateway receiving the mapping for the host.

BRIEF SUMMARY

Aspects of the disclosure are directed to a provider edge synchronizer for coordinating entries in an overlay network. The provider edge synchronizer can determine and maintain mappings for hosts in the overlay network using lookup tables. When a provider edge gateway in the overlay network sends a request, the provider edge synchronizer can generate a response based on the lookup tables and can then send the response to gateways in the overlay network, such as all gateways.

An aspect of the disclosure provides for a method for synchronizing redundant centralized gateways in an overlay network, including: receiving, by one or more processors, one or more traffic requests from one or more redundant centralized gateways; determining, by the one or more processors, for each of the one or more traffic requests, whether respective protocols of the one or more traffic requests are stored in one or more lookup tables; generating, by the one or more processors, respective traffic replies associated with each of the one or more traffic requests determined to have the respective protocols stored in the one or more lookup tables; and sending, by the one or more processors, the traffic replies to the one or more redundant centralized gateways.

In an example, the method further includes: sending, by the one or more processors, respective additional traffic requests to destination hosts associated with each of the one or more traffic requests determined not to have the respective protocols stored in the one or more lookup tables; and receiving, by the one or more processors, respective responses from the destination hosts including protocols for storing in the one or more lookup tables. In another example, the method further includes: generating, by the one or more processors, respective additional traffic replies based on the responses from the destination hosts; and sending, by the one or more processors, the additional traffic replies to the one or more redundant centralized gateways. In yet another example, the method further includes updating, by the one or more processors, the one or more lookup tables with the protocols from the destination hosts.

In yet another example, the method further includes: identifying, by the one or more processors, the one or more redundant centralized gateways by receiving protocol advertisements; and generating, by the one or more processors, the one or more lookup tables using the protocol advertisements. In yet another example, the protocol advertisements include at least one of route type (RT)-2 advertisements or RT-3 advertisements.

In yet another example, the one or more lookup tables include a mapping of media access control (MAC) addresses and internet protocol (IP) addresses for the one or more redundant centralized gateways. In yet another example, the one or more traffic requests include address resolution protocol (ARP)/neighbor discovery (ND) requests and the traffic replies comprise ARP/ND replies.

Another aspect of the disclosure provides for a system including: one or more processors; and one or more storage devices coupled to the one or more processors and storing instructions that, when executed by the one or more processors, cause the one or more processors to perform operations for synchronizing redundant centralized gateways in an overlay network. The operations include: receiving one or more traffic requests from one or more redundant centralized gateways; determining, for each of the one or more traffic requests, whether respective protocols of the one or more traffic requests are stored in one or more lookup tables; generating respective traffic replies associated with each of the one or more traffic requests determined to have the respective protocols stored in the one or more lookup tables; and sending the traffic replies to the one or more redundant centralized gateways.

In an example, the operations further include: sending respective additional traffic requests to destination hosts associated with each of the one or more traffic requests determined not to have the respective protocols stored in the one or more lookup tables; and receiving respective responses from the destination hosts including protocols for storing in the one or more lookup tables. In another example, the operations further include: generating respective additional traffic replies based on the responses from the destination hosts; and sending the additional traffic replies to the one or more redundant centralized gateways. In yet another example, the operations include updating the one or more lookup tables with the protocols from the destination hosts.

In yet another example, the operations further include: identifying the one or more redundant centralized gateways by receiving protocol advertisements; and generating the one or more lookup tables using the protocol advertisements. In yet another example, the protocol advertisements include at least one of route type (RT)-2 advertisements or RT-3 advertisements.

In yet another example, the one or more lookup tables include a mapping of media access control (MAC) addresses and internet protocol (IP) addresses for the one or more redundant centralized gateways. In yet another example, the one or more traffic requests include address resolution protocol (ARP)/neighbor discovery (ND) requests and the traffic replies comprise ARP/ND replies.

Yet another aspect of the disclosure provides for a non-transitory computer readable medium for storing instructions that, when executed by one or more processors, cause the one or more processors to perform operations for synchronizing redundant centralized gateways in an overlay network. The operations include: receiving one or more traffic requests from one or more redundant centralized gateways; determining, for each of the one or more traffic requests, whether respective protocols of the one or more traffic requests are stored in one or more lookup tables; generating respective traffic replies associated with each of the one or more traffic requests determined to have the respective protocols stored in the one or more lookup tables; and sending the traffic replies to the one or more redundant centralized gateways.

In an example, the operations further include: sending respective additional traffic requests to destination hosts associated with each of the one or more traffic requests determined not to have the respective protocols stored in the one or more lookup tables; receiving respective responses from the destination hosts including protocols for storing in the one or more lookup tables; generating respective additional traffic replies based on the responses from the destination hosts; and sending the additional traffic replies to the one or more redundant centralized gateways. In another example, the operations include updating the one or more lookup tables with the protocols from the destination hosts.

In yet another example, the one or more lookup tables include a mapping of media access control (MAC) addresses and internet protocol (IP) addresses for the one or more redundant centralized gateways.

BRIEF DESCRIPTION OF THE DRAWINGS

FIG. 3 depicts example lookup tables generated by a controller of a PE synchronizer according to aspects of the disclosure.

DETAILED DESCRIPTION

Figure 1:
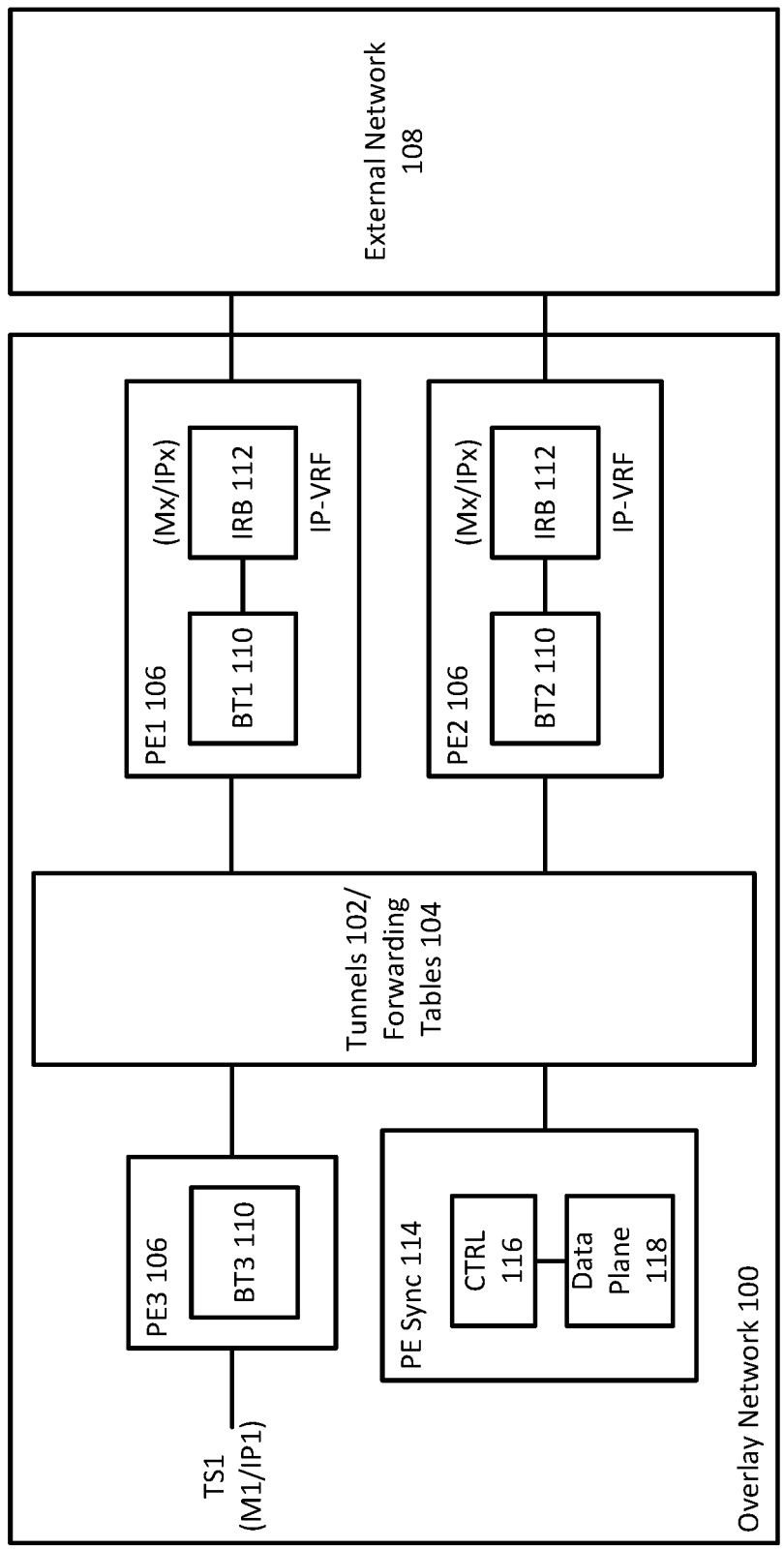
FIG. 1 depicts a block diagram of an example overlay network according to aspects of the disclosure.

The technology relates generally to a provider edge (PE) synchronizer configured to coordinate requests and/or replies in an overlay network. The PE synchronizer can learn and maintain a mapping, e.g., internet protocol (IP) and/or media access control (MAC) addresses, for hosts of the overlay network using lookup tables. The PE synchronizer can identify PEs based on protocol messages. When a PE in the overlay network sends a request, if the request is from a gateway, the PE synchronizer can generate a response based on the lookup tables. The PE synchronizer can send a response to all gateways in the overlay network. The PE synchronizer can remove any potential inconsistencies among redundant centralized gateways in the overlay network so that traffic is correctly forwarded by any redundant centralized gateway. The PE synchronizer can allow for avoiding traffic loss to a host replying to the wrong redundant centralized gateway.

An overlay network can correspond to a virtual network overlaid on top of an underlying physical network. The physical network can correspond to an underlay network. The overlay network can provide virtualization and tenant isolation using tunnels and forwarding tables. Each tenant can have their own hosts, referred to as tenant systems.

PEs can correspond to nodes in the overlay network that perform encapsulation and/or decapsulation to respectively enter and/or exit the overlay network through the tunnels. An example PE can be a gateway that connects the overlay network to another network. Gateways can be centralized, redundant centralized, or distributed.

A PE synchronizer can be implemented to avoid inconsistencies among redundant centralized gateways. The PE synchronizer can include a controller and a data plane. The controller can be configured to send/receive messages to/from PEs participating in a traffic instance. The controller can further be configured to receive, generate, and/or inject control packets to the data plane. The PE synchronizer can also be configured to participate in underlay routing to establish reachability to other PEs. The data plane can be configured to reject all traffic except the traffic the controller is configured to inspect. The data plane can be configured to encapsulate packets that are injected by the controller and to route the encapsulated packets to their destination. The data plane can include a plurality of bridge tables (BTs) to store MAC and/or IP addresses for synchronizing the redundant centralized gateways.

The controller on the PE synchronizer can be added to a flood list of each overlay instance. The controller can build one or more lookup tables of MAC addresses, IP addresses, and/or virtual tunnel endpoint (VTEP) information of the PEs using protocol advertisements from the PEs. For example, the controller can listen to protocol advertisements from the PEs and traffic requests/replies from hosts and can build one or more lookup tables that contain mappings of IP addresses and MAC addresses. The data plane can be configured to send messages to the controller for generating or updating the lookup tables.

Example lookup tables can include a tunnel endpoint table and a MAC-IP table. The controller can build the tunnel endpoint table for each overlay segment or ethernet virtual private network (EVPN) instance, which can be abbreviated as EVI. The tunnel endpoint table can be populated using route type-3 (RT-3) advertisements. When an RT-3 advertisement is received, the controller can use the IP address from the route entry and tunnel identifier to populate the table. Route type-2 (RT-2) advertisements can be used to tag if the endpoint is a gateway. Next-hop IP from RT-2 can be used as a key to find the tunnel endpoint in this table. The controller can maintain the MAC-IP table for each overlay segment/EVI instance. The controller can generate and update mappings of IP address and MAC addresses based on address resolution protocol (ARP)/neighbor discovery (ND) requests and replies as well as RT-2 advertisements.

When a centralized redundant gateway sends a traffic request, the controller of the PE synchronizer can receive the traffic request. The controller can perform a lookup in its one or more tables. If there is a match of IP addresses for the traffic request, the controller can generate a traffic reply containing an IP to MAC address mapping and can send the traffic reply to centralized redundant gateways, such as all centralized redundant gateways in the overlay network. If there is no match for the traffic request, the controller can send another traffic request to the actual destination, receive a response from the destination host that includes traffic protocols, and generate a traffic reply that is sent to redundant centralized gateways, such as all redundant centralized gateways in the overlay network.

FIG. 1 depicts a block diagram of an example overlay network 100. The overlay network 100 can correspond to one or more virtual networks layered on top of a host physical network. The overlay network can also be referred to as a network virtualization overlay (NVO) or tenant network. Example overlay networks can include a virtual local area network (VLAN), a software defined network (SDN), or an ethernet virtual private network (EVPN)/ virtual extensible local area network (VXLAN). EVPN can correspond to a control plane protocol and VXLAN can correspond to a data plane tunneling protocol. The control plane can determine how data should be managed, routed, and/or processed through the network while the data plane can perform the data management, routing, and/or processing based on instructions from the control plane.

The overlay network 100 can include tunnels 102 and/or forwarding tables 104 to provide virtualization and tenant isolation. Forwarding tables 104 can store a next hop for each network and forward received packets to the next hop through the tunnels 102. Example tunnels can include VXLAN, network virtualization using generic routing encapsulation (NVGRE), or generic network virtualization encapsulation (GENEVE).

The overlay network 100 can further include a plurality of provider edges (PEs) 106 connected via the tunnels 102. While FIG. 1 depicts three PEs 106 for simplicity, the overlay network 100 can include any number of PEs 106. The PEs 106 can perform encapsulation and/or decapsulation to respectively enter and/or exit the overlay network 100 through the tunnels 102, acting as virtual tunnel endpoints (VTEPs). The PEs 106 can also connect to other PEs within the overlay network 100 through the tunnels 102 to transmit and/or receive packets. Example PEs can include switches or routers. The PEs 106 can include a bridge table (BTs) 110 and/or integrated routing and bridging (IRB) 112 configured to store MAC and/or IP addresses of hosts of the overlay network 100. The BTs 110 and the IRBs 112 can provide layer-2 isolation between different tenants via MAC-virtual routing and forwarding (VRF). The BTs 110 and IRBs 112 can also provide layer-3 isolation between different tenants via IP-VRF.

The PEs 106 can correspond to gateways that connect the overlay network 100 to another network 108 external to the overlay network 100. Gateways can be centralized, redundant centralized, or distributed. A gateway can be a centralized gateway when an overlay network includes a single gateway, which would be the centralized gateway, to enter and exit the overlay network. Gateways can be redundant centralized gateways when an overlay network includes two or more gateways, which would be the centralized redundant gateways, to enter and exit the overlay network. Gateways can be distributed gateways when an overlay network includes every PE as a gateway to enter and exit the overlay network. As depicted in FIG. 1, PE1 and PE2 are redundant centralized gateways while PE3 is not a gateway. Since PE3 is not a gateway, PE3 does not include an IRB. PE3 only performs bridging rather than bridging and routing.

Redundant centralized gateways can have the same anycast MAC and/or IP address, which can be advertised to other PEs 106 as RT-2, such as EVPN RT-2. A PE 106 can select one or more of the advertisements from the redundant centralized gateways and can program its forwarding table 104 so that traffic encapsulated with a destination MAC address of the redundant centralized gateways is forwarded to one of the redundant centralized gateways.

In an example, one redundant centralized gateway may have an IP to MAC mapping for a host, but another redundant centralized gateway may not have the IP to MAC mapping. This can occur due to address resolution protocol (ARP)/neighbor discovery (ND) cache entries not being synchronized between redundant centralized gateways. If traffic from another network to the host reaches the redundant centralized gateway without the IP to MAC mapping, the redundant centralized gateway without the IP to MAC mapping will try to resolve the MAC for the host. This operation may not succeed if the host sends the ARP/ND reply to the other redundant centralized gateway, resulting in traffic loss. The overlay network 100 includes a PE synchronizer 114 having a controller 116 and a data plane 118 to avoid such potential redundant centralized gateway inconsistencies. The PE synchronizer 114 can be connected to the PEs 106 via the tunnels 102 to synchronize any redundant centralized gateways in the overlay network 100.

Figure 2:
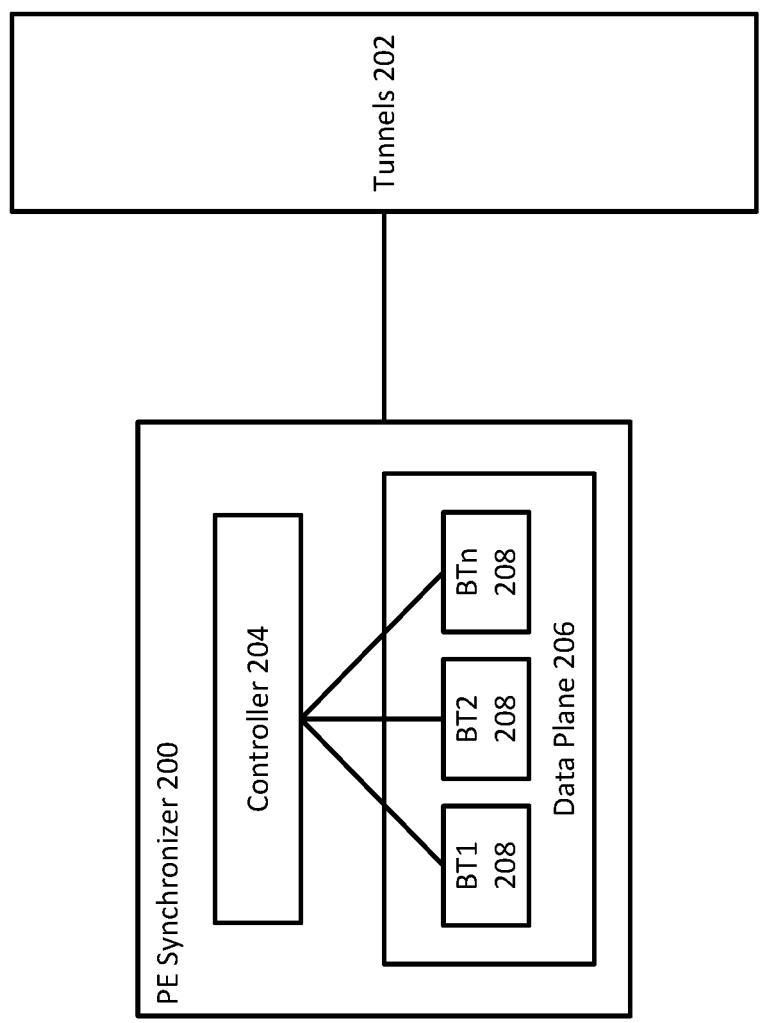
FIG. 2 depicts a block diagram of an example provider edge (PE) synchronizer for an overlay network according to aspects of the disclosure.

FIG. 2 depicts a block diagram of an example PE synchronizer 200 for an overlay network. The PE synchronizer 200 can correspond to the PE synchronizer 114 as depicted in FIG. 1. The PE synchronizer 200 can be connected to any redundant centralized gateways via tunnels 202. The PE synchronizer 200 can include a controller 204 and a data plane 206. The data plane 206 can include a plurality of BTs 208, where each BT has a corresponding BT in a PE of the overlay network. For example, if the overlay network has three PEs, each including their own BT, then the PE synchronizer 200 can include three BTs 208 in the data plane 206. The BTs 208 can store MAC and/or IP addresses for synchronizing the redundant centralized gateways.

The controller 204 can send messages to any PEs participating in a traffic instance. The controller 204 can also receive messages from any PEs participating in the traffic instance. If the controller 204 receives a message from a redundant centralized gateway, the controller 204 can respond with the MAC address corresponding to the IP address in the message. Other messages received by the controller 204, such as ARP/ND requests/replies from other hosts, can be used to update lookup tables for the PE synchronizer 200. For example, the controller 204 can be configured to send or receive EVPN messages to or from PEs participating in an EVPN instance (EVI). The controller 204 can also generate and inject control packets to the data plane 206 as well as receive control packets from the data plane 206. For example, the controller 204 can be configured to generate, inject, and/or receive ARP/NS to or from the data plane 206.

The PE synchronizer 200 can further determine which PEs are within reach by participating in the underlay routing. For example, the data plane 206 can accept traffic the controller 204 plans to inspect while rejecting other traffic. The data plane 206 can encapsulate traffic based on inspection from the controller 204 and then route the encapsulated traffic to their destination.

The PEs can add the controller 204 to their respective flood lists for each traffic instance. A flood list can correspond to a list of all identifiers of a PE that participates in a specific broadcast domain or overlay segment advertised using RT-3 advertisements. For example, the flood list can include IP addresses for PEs participating in a traffic instance. The controller 204 can generate a RT-3 advertisement, advertising itself as a VTEP. PEs that receive the RT-3 advertisement can add the PE synchronizer 200 to their respective flood lists.

The controller 204 can generate one or more lookup tables using protocol advertisements from the PEs, such as RT-2 or RT-3 advertisements. The controller 204 can store the lookup tables in its memory. The lookup tables can include mappings of IP addresses, MAC addresses, and/or VTEP information. The controller 204 can generate the one or more lookup tables by listening to the protocol advertisements from the PEs as well as traffic requests or replies from hosts, such as ARP/ND requests or replies received via the data plane 206. The controller 204 can further update the one or more lookup tables as it continues to listen to the protocol advertisements and traffic requests or replies.

FIG. 3 depicts example lookup tables 300 generated by a controller of a PE synchronizer, such as the PE synchronizer 114 as depicted in FIG. 1. The lookup tables 300 can include a tunnel endpoint table 302 and a MAC-IP table 304. The tunnel endpoint table 302 can include fields for tunnel endpoint IP address, tunnel identifier, and/or whether the tunnel is a gateway to another network. The MAC-IP table 304 can include fields for MAC address and IP address.

The controller can generate and maintain the tunnel endpoint table 302 using each overlay segment or EVI by populating the tunnel endpoint table 302 based on protocol advertisements, such as RT-3 advertisements and RT-2 advertisements. When the controller receives an RT-3 advertisement, the controller can populate the table with the IP address and tunnel identifier from the route entry. When the controller receives an RT-2 advertisement, the controller can determine whether the endpoint is a gateway based on a next-hop IP address and populate the table accordingly.

The controller can generate and maintain the MAC-IP table 304 for each overlay segment or EVI. The controller can generate and update mappings of IP address and MAC addresses based on traffic requests and replies as well as protocol advertisements. For example, the controller can populate the MAC-IP table 304 using ARP/ND requests or replies and RT-2 advertisements.

When a redundant centralized gateway sends a traffic request, the controller of the PE synchronizer can receive the traffic request. The controller can perform a lookup in its one or more tables. If there is a match of IP addresses for the traffic request, the controller can generate a traffic reply containing an IP to MAC address mapping and can send the traffic reply to any redundant centralized gateways. If there is no match for the traffic request, the controller can send another traffic request, to the actual destination, receive a response from the destination host that includes traffic protocols, and generate a traffic reply that is sent to any redundant centralized gateways.

Figure 4:
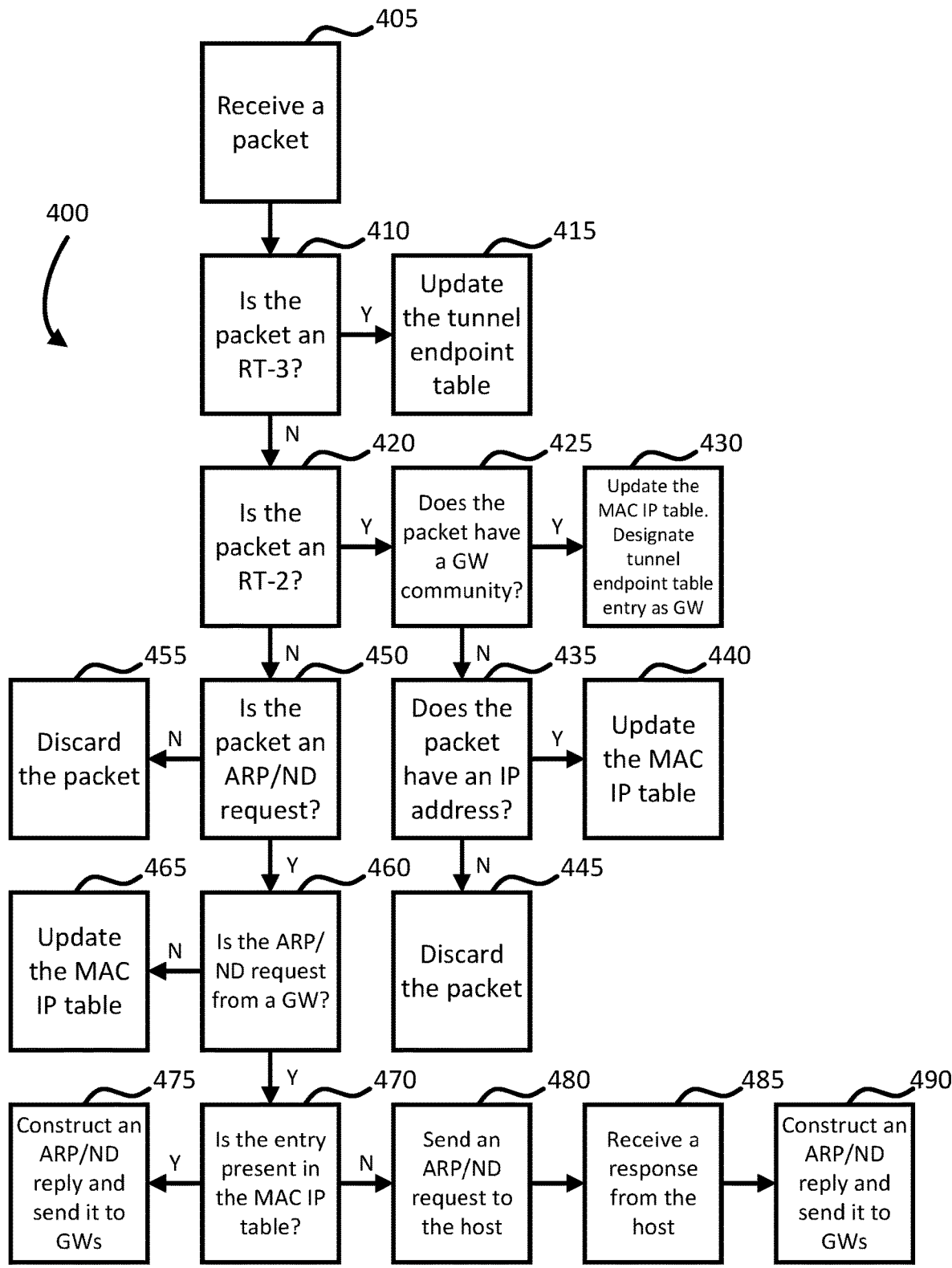
FIG. 4 depicts a flow diagram of an example process for synchronizing redundant centralized gateways in an overlay network according to aspects of the disclosure.

FIG. 4 depicts a flow diagram of an example process 400 for synchronizing redundant centralized gateways in an overlay network. The example process 400 can be performed on a system of one or more processors in one or more locations, such as the example PE synchronizer 114 as depicted in FIG. 1.

As shown in block 405, the PE synchronizer 114 receives a packet. As shown in block 410, the PE synchronizer 114 determines whether the packet is an RT-3 advertisement, such as by identifying the packet type from one or fields of the packet encapsulation or frame. The one or more fields can correspond to protocol encodings. If the packet is an RT-3 advertisement, as shown in block 415, the PE synchronizer 114 can update a tunnel endpoint table of its lookup tables. For example, the PE synchronizer 114 can update or populate the tunnel endpoint IP address and tunnel identifier fields of the tunnel endpoint table.

If the packet is not an RT-3 advertisement, as shown in block 420, the PE synchronizer 114 determines whether the packet is an RT-2 advertisement, such as by identifying the packet type from one or more fields of the packet encapsulation or frame. If the packet is an RT-2 advertisement, as shown in block 425, the PE synchronizer 114 determines whether the packet has a gateway (GW) community, such as by identifying whether there is a gateway community in one or more fields of the packet encapsulation or frame. A GW community can refer to a group of redundant gateways. If the packet has a gateway community, as shown in block 430, the PE synchronizer 114 can update its look up tables. For example, the PE synchronizer 114 can update the tunnel endpoint table to indicate the corresponding entry is a gateway. As another example, the PE synchronizer 114 can update a MAC-IP table with a MAC to IP address mapping.

If the packet does not have a gateway community, as shown in block 435, the PE synchronizer 114 determines whether the packet has an IP address, such as by identifying whether there is an IP address in one or more fields of the packet encapsulation or frame. If the packet has an IP address, as shown in block 440, the PE synchronizer 114 can update a MAC-IP table of its lookup tables. For example, the PE synchronizer 114 can generate or update an IP address in an entry for the packet in the MAC to IP address mapping. If the packet does not have an IP address, as shown in block 445, the PE synchronizer 114 can discard the packet.

Referring back to block 420, if the PE synchronizer 114 determines the packet is not an RT-2 advertisement, as shown in block 450, the PE synchronizer 114 determines whether the packet is an ARP/ND request, such as by identifying the packet type from one or more fields of the packet encapsulation or frame. If the packet is not an ARP/ND request, as shown in block 455, the PE synchronizer 114 can discard the packet.

If the packet is an ARP/ND request, as shown in block 460, the PE synchronizer 114 determines whether the ARP/ND request is from a gateway, such as from the tunnel source IP address or MAC address source of the ARP/ND request. If the ARP/ND request is not from a gateway, as shown in block 465, the PE synchronizer 114 can update the MAC-IP table of its lookup tables. For example, the PE synchronizer 114 can update the MAC-IP table to indicate the corresponding entry is not a gateway.

If the ARP/ND request is from a gateway, as shown in block 470, the PE synchronizer 114 determines whether a corresponding entry for the ARP/ND request is present in the MAC-IP table. If the ARP/ND request has a corresponding entry in the MAC-IP table, as shown in block 475, the PE synchronizer 114 can construct an ARP/ND reply to send to all gateways of the overlay network. If the ARP/ND request does not have a corresponding entry in the MAC-IP table, as shown in block 480, the PE synchronizer 114 can send an ARP/ND request to a host of the overlay network corresponding to a destination for the packet. As shown in block 485, the PE synchronizer 114 can receive a response from the host. As shown in block 490, the PE synchronizer 114 can construct an ARP/ND reply to send to all gateways of the overlay network based on the response from the host. The PE synchronizer 114 can also update the MAC-IP table to generate a corresponding entry.

Figure 5:
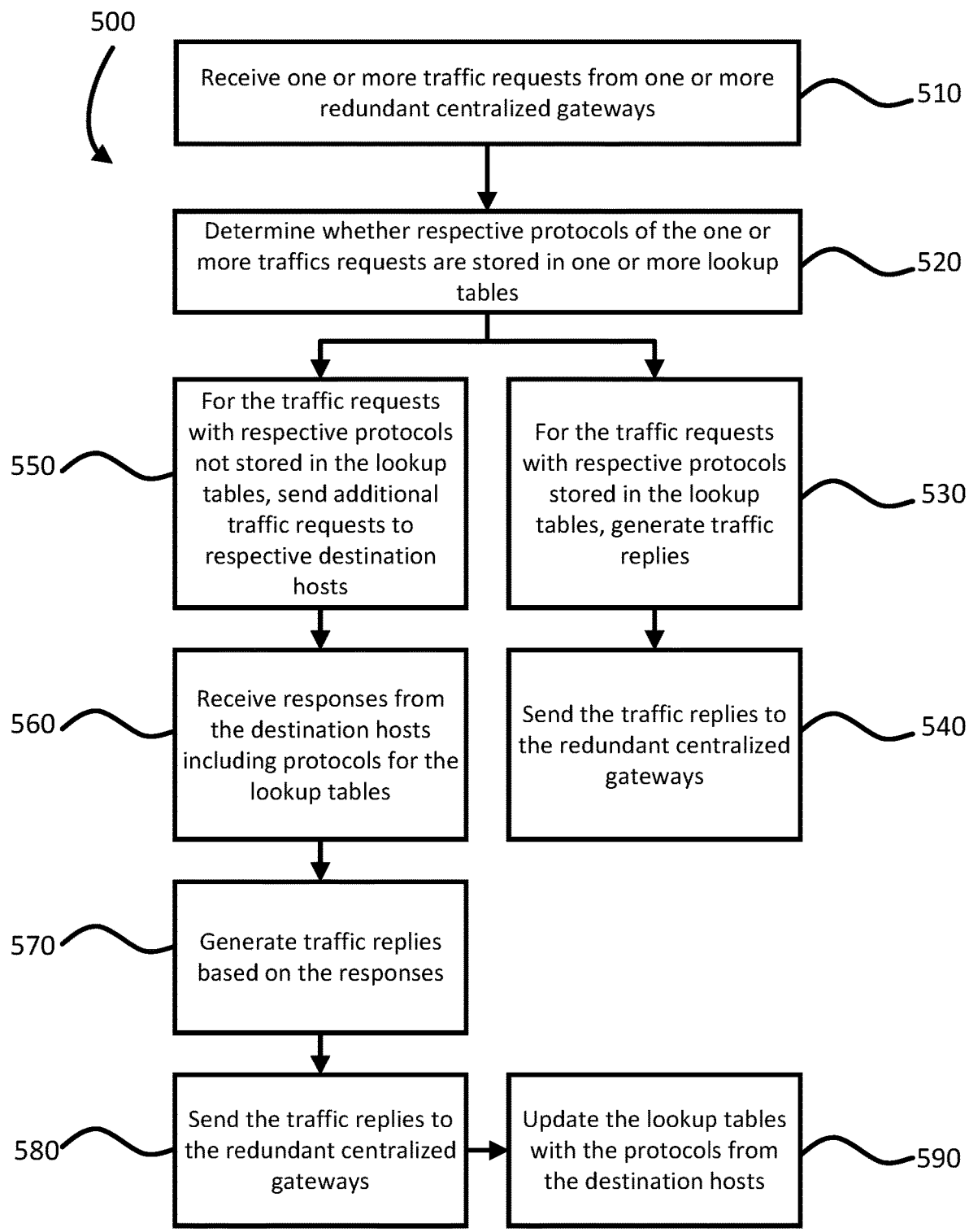
FIG. 5 depicts a flow diagram of an example process for synchronizing redundant centralized gateways in an overlay network according to aspects of the disclosure.

FIG. 5 depicts a flow diagram of an example process 500 for synchronizing redundant centralized gateways in an overlay network. The example process 500 can be performed on a system of one or more processors in one or more locations, such as the example PE synchronizer 114 as depicted in FIG. 1.

As shown in block 510, the PE synchronizer 114 receives one or more traffic requests from one or more redundant centralized gateways. The one or more traffic requests can include ARP/ND requests.

As shown in block 520, the PE synchronizer 114 determines whether respective protocols of the one or more traffic requests are stored in one or more lookup tables. The protocols can include MAC addresses, IP addresses, and/or VTEP information, and the one or more lookup tables can include a mapping of the MAC addresses, IP addresses, and/or VTEP information for the one or more redundant centralized gateways.

For the traffic requests determined to have their respective protocols stored in the one or more lookup tables, as shown in block 530, the PE synchronizer 114 can generate one or more traffic replies based on the stored protocols. The one or more traffic replies can include ARP/ND replies. As shown in block 540, the PE synchronizer 114 can send the one or more traffic replies to the redundant centralized gateways to synchronize them.

For the traffic requests determined not to have their respective protocols stored in the one or more lookup tables, as shown in block 550, the PE synchronizer 114 can send additional traffic requests to respective destination hosts. The additional traffic requests can include ARP/ND requests. As shown in block 560, the PE synchronizer 114 can receive responses from the destination hosts that include protocols for the one or more lookup tables. The responses can include MAC addresses, IP addresses, and/or VTEP information for updating mappings in the one or more lookup tables for the redundant centralized gateways. As shown in block 570, the PE synchronizer 114 can generate one or more traffic replies based on the responses from the destination hosts. As shown in block 580, the PE synchronizer 114 can send the one or more traffic replies to the redundant centralized gateways to synchronize them. As shown in block 590, the PE synchronizer 114 can update the one or more lookup tables with the protocols received in the responses from the destination hosts.

Figure 6:
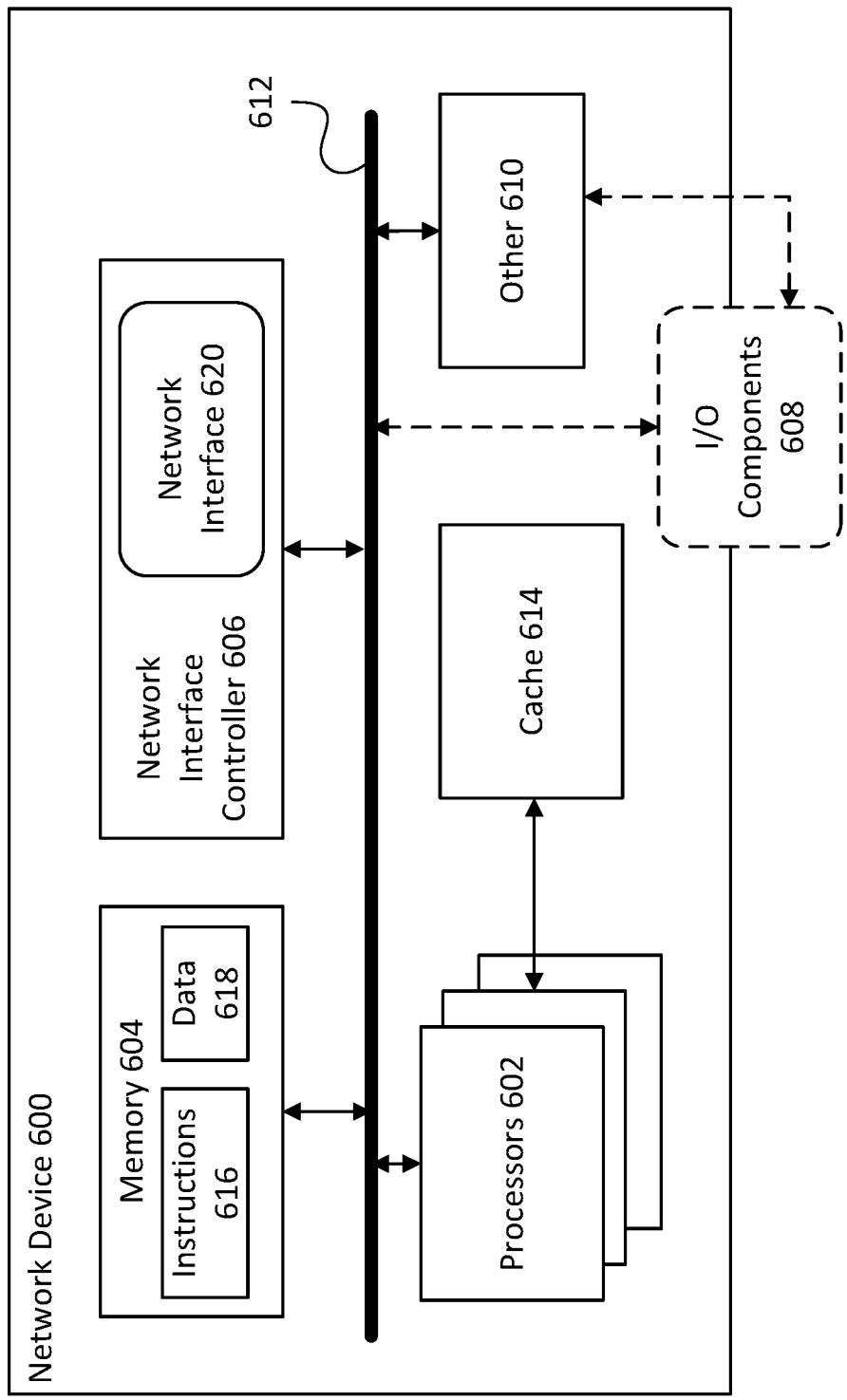
FIG. 6 depicts a block diagram of an example network device for a network according to aspects of the disclosure.

FIG. 6 depicts a block diagram of an example network device 600 for a network. The network device 600 can correspond to one of the PEs 106 or the PE synchronizer 114 for an overlay network 100 as depicted in FIG. 1. The network device 600 can participate in the network as a data source, data destination or data sink, and/or intermediary device, such as a switch, router, and/or gateway propagating data from a source towards a destination through the network. The network device 600 can be connected to other network devices within the network with network links.

The network can facilitate interactions and/or convey information between the network device 600 and other network devices. Example networks include the Internet, local networks, network fabrics, or any other local area or wide area network. The network can include multiple connected sub-networks or autonomous networks. The network can be a local-area network (LAN), a metropolitan area network (MAN), a wide area network (WAN), an inter-network such as the Internet, or a peer-to-peer network. Any type and/or form of data network and/or communication network can be used for the network. The network can be public, private, or a combination of public and private.

The network device 600 can include one or more processors 602 in communication with memory 604, at least one network interface controller 606, input/output (I/O) components 608, and other components 610. The processors 602 can be in communication with or connected to the memory 604, network interface controller 606, I/O components 608, and/or other components 610 via a bus 612. The processors 602 can incorporate or be connected to a cache memory 614. In some examples, instructions are read from the memory 604 into the cache memory 614 and executed by the processors 602 from the cache memory 614.

The processors 602 can be any logic circuitry that executes instructions fetched from the memory 604 or cache 614. The processors 602 can be microprocessor units or special purpose processors. The network device 600 can be based on any processor, or set of processors, capable of operating as described herein. The processors 602 can be single core or multi-core processors. The processors 602 can be multiple distinct processors. The processors 602 can be implemented as circuitry on one or more chips. As examples, the processors 602 can include one or more central processing units (CPUs), graphic processing units (GPUs), field-programmable gate arrays (FPGAs), and/or application-specific integrated circuits (ASICs), such as tensor processing units (TPUs).

The memory 604 can be any transitory or non-transitory computer readable medium for storing computer readable data, such as volatile or non-volatile memory. The memory 604 can be a fixed storage or a removable storage. Examples can include a hard-drive, solid state drive, tape drive, optical storage, memory card, ROM, RAM, DVD, CD-ROM, write-capable, and read-only memories. The memory 604 can include instructions 616 and data 618.

The instructions 616 can include one or more instructions that when executed by the processors 602, cause the one or more processors to perform actions defined by the instructions 616. The instructions 616 can be stored in object code format for direct processing by the processors 602, or in other formats including interpretable scripts or collections of independent source code modules that are interpreted on demand or compiled in advance. The instructions 616 can include instructions for synchronizing redundant centralized gateways of the overlay network. The instructions 616 can be executed using the processors 602, and/or using other processors located remotely from the network device 600.

The data 618 can be retrieved, stored, or modified by the processors 602 in accordance with the instructions 616. The data 618 can be stored in computer registers, in a relational or non-relational database as a table having a plurality of different fields and records, or as JSON, YAML, proto, or XML documents. The data 618 can also be formatted in a computer-readable format such as, but not limited to, binary values, ASCII, or Unicode. Moreover, the data 618 can include information sufficient to identify relevant information, such as numbers, descriptive text, proprietary codes, pointers, references to data stored in other memories, including other network locations, or information that is used by a function to calculate relevant data.

The cache memory 614 can be a form of computer memory placed in close proximity to the processors 602 for fast access times. The cache memory 614 can be part of, or on the same chip as, the processors 602. There can be multiple levels of cache 614, e.g., level 2 and level 3 cache layers.

The network interface controller 606 can manage data exchanges via a network interface 620. The network interface controller 606 can handle the physical and data link layers of the open systems interconnection (OSI) model for network communication. Some of the tasks of the network interface controller 606 can be handled by one or more of the processors 602. The network interface controller 606 can be incorporated into the processors 602, such as circuitry on the same chip.

The network device 600 can have multiple network interfaces 620 controlled by a single controller 606 or multiple network interface controllers 606. Each network interface 620 can be a connection point for a physical network link, e.g., a cat-5 or cat-6 Ethernet link. The network interface controller 606 can support wireless network connections and an interface port 620 can be a wireless, e.g., radio, receiver/transmitter. The network interface controller 606 can implement one or more network protocols such as Ethernet. The network device 600 can exchange data with other network devices via physical or wireless links through the network interface 620. The network interface 620 can link directly to another device or to another device via an intermediary device, e.g., a hub, a bridge, a switch, or a router, connecting the network device 600 to a data network such as the Internet.

The network device 600 can include, or provide interfaces for, one or more input or output (I/O) components 608. Input devices can include keyboards, microphones, touch screens, sensors, and pointing devices, such as a mouse or trackball, as examples. Output devices can include video displays, speakers, and printers, as examples.

Other components 610 can include an I/O interface, external serial device ports, and any additional co-processors. For example, the network device 600 can include an interface, e.g., a universal serial bus (USB) interface, for connecting input devices, output devices, or additional memory devices, e.g., portable flash drive or external media drive. The network device 600 can include an additional co-processor, such as a math co-processor to assist the processors 602 with high precision or complex calculations.

Aspects of this disclosure can be implemented in digital circuits, computer-readable storage media, as one or more computer programs, or a combination of one or more of the foregoing. The computer-readable storage media can be non-transitory, e.g., as one or more instructions executable by a cloud computing platform and stored on a tangible storage device.

The phrase "configured to" is used in different contexts related to computer systems, hardware, or part of a computer program. When a system is said to be configured to perform one or more operations, this means that the system has appropriate software, firmware, and/or hardware installed on the system that, when in operation, causes the system to perform the one or more operations. When some hardware is said to be configured to perform one or more operations, this means that the hardware includes one or more circuits that, when in operation, receive input and generate output according to the input and corresponding to the one or more operations. When a computer program is said to be configured to perform one or more operations, this means that the computer program includes one or more program instructions, that when executed by one or more computers, causes the one or more computers to perform the one or more operations.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method for synchronizing redundant centralized gateways in an overlay network, comprising:
   identifying, by one or more processors, a gateway community indicative of a plurality of redundant centralized gateways based on protocol advertisements, wherein the protocol advertisements comprise a route type (RT)-2 advertisement;
   updating, by the one or more processors, one or more lookup tables in response to identifying the gateway community;
   receiving, by the one or more processors, one or more traffic requests from the redundant centralized gateways;
   determining, by the one or more processors, for each of the one or more traffic requests, whether protocols of the respective traffic requests are stored in the one or more lookup tables;
   generating, by the one or more processors, traffic replies associated with each of the respective traffic requests determined to have the protocols stored in the one or more lookup tables; and
   sending, by the one or more processors, the traffic replies to each of the redundant centralized gateways.

2. The method of claim 1, further comprising:
   sending, by the one or more processors, additional traffic requests to destination hosts associated with each of the respective traffic requests determined not to have the protocols stored in the one or more lookup tables; and
   receiving, by the one or more processors, respective responses from the destination hosts including protocols for storing in the one or more lookup tables.

3. The method of claim 2, further comprising:
   generating, by the one or more processors, additional traffic replies based on the responses from the destination hosts; and
   sending, by the one or more processors, the additional traffic replies to each of the redundant centralized gateways.

4. The method of claim 2, further comprising updating, by the one or more processors, the one or more lookup tables with the protocols from the destination hosts.

5. The method of claim 1, further comprising:
   receiving, by the one or more processors, the protocol advertisements; and
   generating, by the one or more processors, the one or more lookup tables using the protocol advertisements.

6. The method of claim 1, wherein the protocol advertisements further comprise a RT-3 advertisements.

7. The method of claim 1, wherein the one or more lookup tables comprise a mapping of media access control (MAC) addresses and internet protocol (IP) addresses for the redundant centralized gateways.

8. The method of claim 1, wherein the one or more traffic requests comprise address resolution protocol (ARP)/neighbor discovery (ND) requests and the traffic replies comprise ARP/ND replies.

9. A system comprising:
   one or more processors; and
   one or more storage devices coupled to the one or more processors and storing instructions that, when executed by the one or more processors, cause the one or more processors to perform operations for synchronizing redundant centralized gateways in an overlay network, the operations comprising:
   identifying a gateway community indicative of a plurality of redundant centralized gateways based on protocol advertisements, wherein the protocol advertisements comprise a route type (RT)-2 advertisement;
   updating one or more lookup tables in response to identifying the gateway community;

receiving one or more traffic requests from the redundant centralized gateways;

determining, for each of the one or more traffic requests, whether protocols of the respective traffic requests are stored in the one or more lookup tables;

generating traffic replies associated with each of the respective traffic requests determined to have the protocols stored in the one or more lookup tables; and sending the traffic replies to each of the redundant centralized gateways.

10. The system of claim 9, wherein the operations further comprise:

sending additional traffic requests to destination hosts associated with each of the respective traffic requests determined not to have the protocols stored in the one or more lookup tables; and receiving respective responses from the destination hosts including protocols for storing in the one or more lookup tables.

11. The system of claim 10, wherein the operations further comprise:

generating additional traffic replies based on the responses from the destination hosts; and sending the additional traffic replies to each of the redundant centralized gateways.

12. The system of claim 10, wherein the operations comprise updating the one or more lookup tables with the protocols from the destination hosts.

13. The system of claim 9, wherein the operations further comprise:

receiving the protocol advertisements; and generating the one or more lookup tables using the protocol advertisements.

14. The system of claim 9, wherein the protocol advertisements further comprise a RT-3 advertisements.

15. The system of claim 9, wherein the one or more lookup tables comprise a mapping of media access control (MAC) addresses and internet protocol (IP) addresses for the redundant centralized gateways.

16. The system of claim 9, wherein the one or more traffic requests comprise address resolution protocol (ARP)/neighbor discovery (ND) requests and the traffic replies comprise ARP/ND replies.

17. A non-transitory computer readable medium for storing instructions that, when executed by one or more processors, cause the one or more processors to perform operations for synchronizing redundant centralized gateways in an overlay network, the operations comprising:

identifying a gateway community indicative of a plurality of redundant centralized gateways based on protocol advertisements, wherein the protocol advertisements comprise a route type (RT)-2 advertisement;

updating one or more lookup tables in response to identifying the gateway community;

receiving one or more traffic requests from the redundant centralized gateways;

determining, for each of the one or more traffic requests, whether protocols of the respective traffic requests are stored in the one or more lookup tables;

generating traffic replies associated with each of the respective traffic requests determined to have the protocols stored in the one or more lookup tables; and sending the traffic replies to each of the redundant centralized gateways.

18. The non-transitory computer readable medium of claim 17, wherein the operations further comprise:

sending additional traffic requests to destination hosts associated with each of the respective traffic requests determined not to have the protocols stored in the one or more lookup tables;

receiving respective responses from the destination hosts including protocols for storing in the one or more lookup tables;

generating additional traffic replies based on the responses from the destination hosts; and sending the additional traffic replies to each of the redundant centralized gateways.

19. The non-transitory computer readable medium of claim 18, wherein the operations comprise updating the one or more lookup tables with the protocols from the destination hosts.

20. The non-transitory computer readable medium of claim 17, wherein the one or more lookup tables comprise a mapping of media access control (MAC) addresses and internet protocol (IP) addresses for the redundant centralized gateways.

* * * * *